2,925,425

OXIDATION OF PHTHALIDE AND MIXTURES THEREOF TO PHTHALIC ANHYDRIDE

Leo L. Contois, Jr., Burlington, Vt., and Hopkins W. Tatum, Corpus Christi, Tex., assignors to Celanese Corporation of America, New York, N.Y., a corporation of Delaware No Drawing. Application May 21, 1957
Serial No. 660,490

17 Claims. (Cl. 260—346.4)

This invention relates to the production of phthalic acid and phthalic anhydride.

It is an object of this invention to provide a new process for the production of phthalic acid or phthalic anhydride.

Another object of this invention is the provision of a new efficient and economical process for the production of phthalic acid or phthalic anhydride by the oxidation of o-xylene with an oxygen-containing gas.

Other objects of this invention will be apparent from the following detailed description and claims. In this description and claims all proportions are by weight unless otherwise indicated.

In accordance with one aspect of this invention phthalic anhydride is produced by the oxidation of phthalide, preferably by reaction of oxygen with a liquid comprising phthalide. In one preferred embodiment, this reaction is carried out by bubbling an oxygen-containing gas through a mixture of o-xylene, o-toluic acid and phthalide, at an elevated temperature and under superatmospheric pressure, in the presence of a suitable oxidation catalyst. It is found that the reaction proceeds smoothly and rapidly, even when the ratio of o-toluic acid to o-xylene in the mixture is very high (e.g. considerably above 3:1, for example about 4 to 6:1 or higher). It is also found that the phthalic anhydride remains dissolved in the reaction mixture.

In accordance with another aspect of this invention, after an o-xylene-containing material is subjected to partial oxidation to form a mixture containing phthalic anhydride in solution, the phthalic anhydride is separated from said mixture by subjecting it to hydrolysis to produce phthalic acid, which is removed, preferably in aqueous phase. The remaining portion of the mixture is then blended with a further quantity of o-xylene and subjected to further oxidation. Advantageously the process is carried out continuously. Thus, in one preferred embodiment of the invention, an oxygen-containing gas is passed through a mixture containing o-xylene, o-toluic acid and phthalide, as described previously, in a reaction zone; a stream of the products is withdrawn continuously from the reaction zone and subjected to hydrolysis and water-extraction to form an aqueous phase containing phthalic acid and a non-aqueous phase containing o-xylene, o-toluic acid and phthalide. After separation of the aqueous phase, the phthalic acid is recovered therefrom in suitable manner, as by evaporation of the water and reconversion of the phthalic acid to phthalic anhydride.

The proportions of the components of the mixture undergoing oxidation may be varied widely. Preferably, at least about 5% of phthalide is present in this mixture, and it is also desirable that this mixture contains at least about 5% each of o-toluic acid and o-xylene. There may also be present impurities, such as m-xylene and partial oxidation products thereof, as well as various other partial reaction products such as esters formed by, probably, reaction between phthalide and o-toluic acid or between phthalide and phthalic anhydride, or autoesters of phthalide. These esters are convertible to phthalic anhydride when they are present in the reaction mixture of this invention. Preferably the o-xylene, o-toluic acid and phthalide, taken together, constitute at least about 80% of the oxidizable compounds of the mixture. Although an inert solvent, substantially non-oxidizable under the conditions of reaction, may be present if desired, excellent results have been obtained without the use of solvent, and the elimination of the necessity for using solvent is an important advantage of the present invention.

As stated, it is preferable to use an oxidation catalyst. Such catalysts may be of the well known type generally employed for oxidation of hydrocarbons or other organic compounds with an oxygen-containing gas. Of these catalysts the most important group contains a metal which exists in at least two valence states, such as cobalt, manganese, iron, chromium, nickel or copper. Although such metals have catalytic properties when used alone they are generally employed in compound form, e.g. as salts. Cobalt salts, such as cobalt acetate and cobalt naphthenate have been found to be particularly useful for the practice of this invention. These materials need only be present in small amounts, for example, 0.001 to 1.0%, based on the weight of the reaction mixture.

The oxygen-containing gas is desirably air, for reasons of economy, but other gases, such as pure oxygen or air enriched with oxygen may be used. The oxygen-containing gas may be distributed through the liquid mixture being oxidized in any suitable manner, as by introducing the gas through a sparger or sintered plate into the bottom of a mass of the liquid in any appropriate reaction vessel, which may contain Berl saddles or other packing material to increase the extent of contact between the gas and the liquid.

The pressure and temperature of the oxidation reaction may be varied widely. It is preferable to use superatmospheric pressure and elevated temperatures in order to increase the rate of oxidation. One suitable range of pressures is about 20 to 1000 p.s.i.g. or higher, preferably about 50 to 200 p.s.i.g. A suitable oxidation temperature is within the range 100 to 225° C., preferably within the range of 135 to 210° C., best results being obtained at about 160 to 185° C.

Water is formed by the oxidation reaction. It is found that when the proportion of water in the reaction mixture builds up, for example to 5 to 10%, the rate of reaction is reduced considerably. Accordingly, it is desirable to remove water of the reaction as it is formed; this may be done conveniently by continuously distilling off a mixture of xylene and water during the reaction, allowing the distillate to separate into two phases, returning the organic non-aqueous phase to the reaction mixture and discarding or otherwise treating the water phase, which may contain dissolved acetic and formic acids as well as other degradation products.

As stated, the oxidation reaction may be carried out continuously, as by feeding a mixture of the o-xylene, o-toluic acid and phthalide continuously to the reaction zone and continuously withdrawing from said zone a phthalic anhydride-containing mixture which has a lower o-xylene content than the feed mixture. For best results the composition of the feed mixture should be so controlled, in relation to the conditions of reaction, that the rate of supply of o-toluic acid and phthalide in the feed mixture is substantially equal to the rate at which these constituents are withdrawn, in the phthalic anhydride-containing mixture, from the reaction zone. When these proportions are used there is an "equilibrium" and the net effect of the passage through the oxidation zone is a conversion of o-xylene to phthalic anhydride. For any given set of reaction conditions these proportions can be determined by successive experiments involving removal of the phthalic anhydride from the withdrawn reaction mixture and recirculation of the remainder of the withdrawn mixture, blended with any selected proportion of o-xylene, until the aforesaid "equilibrium" is reached. Generally, it is found that at "equilibrium" conditions the ratio of o-toluic acid to o-xylene in the reaction mixture is relatively high, for example about 4:1 to 8:1. Thus, under the generally preferred reaction conditions the relative amounts of the constituents of the "equilibrium" reaction mixture are about 8 to 13 parts o-xylene, 57 to 61 parts o-toluic acid, 21 to 28 parts phthalide and 5 to 7 parts by weight of esters formed in the reaction, probably mainly esters of phthalide with itself or with phthalic or o-toluic acids and having a molecular weight above 240 and boiling above 290° C. These proportions were obtained in a system operating at a reaction temperature of 160° C., a pressure of 50 p.s.i.g. and a 27.5% conversion (per pass) of the o-xylene to oxidation products, using air as the oxygen-containing gas and 0.025% cobalt naphthenate as the catalyst, and removing all the phthalic anhydride from the withdrawn mixture before recirculating. Of course all the phthalic anhydride formed need not be removed, and a minor proportion thereof may be recirculated with the other components of the reaction mixture if desired. Phthalic anhydride is stable under the conditions of the oxidation reaction and the recycling thereof has not substantial effect on the efficiency of the reaction, however, the dilution of the feed mixture by the phthalic anhydride, due to recycling will decrease the effective concentration of the other components and therefore decrease the rate of formation of this compound to some extent, and it is preferred to maintain the concentration of this component in the reaction mixture at below about 15%.

Hydrolysis takes place on heating with water. In order to accelerate the hydrolysis, temperatures above about 80° C. are preferred; when temperatures above 100° C. (e.g. 150° C.) are desired, the hydrolysis should be conducted at supermospheric pressure to maintain the mixture liquid. The conditions of hydrolysis should be such as to cause no substantial hydroysis of the phthalide or of the other esters mentioned above, since this would convert these materials to compounds more soluble in water and therefore more extractable by the water used in the extraction step.

The hydrolysis of the phthalic anhydride and the extraction of the resulting phthalic acid from the rest of the reaction products may be effected as a single-step operation. It is generally more efficient to pass the mixed reaction products first to a hydrolysis zone and then to a zone where an aqueous phase containing the o-phthalic acid is separated. Thus, in one procedure a small amount of water is added to the mixed reaction products and the resulting mixture is maintained at an elevated temperature to effect at least partial hydrolysis of the phthalic anhydride, following which the mixture is fed from hte hydrolysis zone to an extraction zone; e.g. a zone where the reaction products are extracted counter-current with water or other suitable liquid; of course, in this case, some hydrolysis may occur in the extraction zone. Alternatively hydrolysis may be effected in the presence of a large amount of water in the hydrolysis zone, and the resulting mixture may be fed to a separation zone, where it is allowed to separate into two phases: an aqueous phase containing the o-phthalic acid, and a water-immiscible phase containing the other constituents.

Separation of the aqueous phase from the water-immiscible may be carried out over a wide range of temperatures. If desired elevated temperatures may be used and it is found that the best separations, from the point of view of solubility of the o-phthalic acid in water balanced against the solubility of water in the other phase, can be effected within the range of about 80 to 150° C., preferably about 90 to 110° C., superatmospheric pressure being used to attain temperatures above about 100° C. Besides the phthalic acid, a small amount of o-toluic acid and still less of the phthalide also appear in the aqueous extract; these may be removed from the water phase by a subsequent extraction with o-xylene. It is preferable to adjust the conditions of the extractions so that the aqueous phase contains a relatively high concentration of o-phthalic acid (e.g. about 10 to 20%), but without actually causing crystallization of o-phthalic acid from said aqueous phase during the extractions. To this end a temperature of about 80 to 120° C. is desirable in the extraction with o-xylene. When a water-soluble catalyst, such as cobalt acetate, is employed for the oxidation reaction some of this catalyst will appear in the aqueous extract.

The m-xylene (or p-xylene) and its partial oxidation products, which may be present as impurities in the reaction mixture, tend to form isophtalic acid, which is insoluble in the other reaction products and which may therefore be removed by any suitable methods, e.g. filtration, preferably before the hydrolysis step. It is preferred that the m-xylene and p-xylene content in the feed be low, e.g. below about 10% based on the o-xylene. Preferably, the fresh feed to the oxidation zone contains at least about 90% o-xylene. 95% o-xylene, containing minor amounts of m-yxlene, ethyl benzene and eight-carbon aliphatic hydrocarbons, is very suitable.

As stated, the phthalic acid may be recovered from the aqueous phase by evaporation of the water and reconversion of the acid to its anhydride. This may be done under normal or superatmospheric pressure. The water also may be removed by azeotropic distillation, or the phthalic acid may be removed from solution by crystallization.

The following examples are given to illustrate this invention further.

*Example 1*

A liquid mixture containing 10.0% o-xylene, 60.0% o-toluic acid and 30% pthalide, to which is added 0.05%, based on the weight of the mixture, of hydrated cobaltous acetate, $Co(C_2H_3O_2)_2 \cdot 4H_2O$, is oxidized at a temperature of 160° C. under a pressure of 50 p.s.i.g. by bubbling air through a column of said liquid mixture contained in tubular reactor, 2 inches in diameter and constructed of stainless steel (type 316). The air is admitted through a sparger mounted 28 inches below the level of the liquid in the column. The column is fitted with a condenser through which the gaseous effluent from the column is passed, and in which the water of reaction, xylene and any other organic materials are condensed; the condensate forms two phases, the water phase being discarded and the xylene phase being returned continuously to the reaction mixture. The liquid mixture is fed continuously to the top of the column and reaction products are withdrawn continuously from the bottom. The air is passed through the column at the rate of 18 cu. ft. per hr. The residence time of the liquid in the column is 37 minutes. 18% of the oxygen supplied is reacted. The rate of oxygen consumption in cu. ft. per minute per sq. in. of cross-sectional area of the reactor is $3.4 \times 10^{-3}$.

27.4% of the o-xylene present in the feed mixture is reacted, the composition of the reaction product being 7.2% o-xylene, 60.7% o-toluic acid, 30.0% phthalide, 1.0% phthalic anhydride and 1.1% of a mixture of esters boiling above 290° C., so that for each 100 moles of o-xylene consumed there are obtained 27.5 moles of o-toluic acid, 3.6 moles of phthalide, 27.3 moles of phthalic anhydride and 16.0 moles of said esters (calculated as molecular weight 270). The carbon recovery is 95.4%; i.e., calculated on the basis of the carbon in the o-xylene which has been oxidized, the carbon in the waste products ($CO$, $CO_2$, acetic and formic acids) represents only 4.6%; if calculated on the basis of the carbon in the total reaction mixture, the carbon lost in the waste products represents 0.16% of the total carbon in the mixture.

Example II

Example I is repeated, except that the feed mixture contains 9.8% ortho-xylene, 57.2% o-toluic acid, 25.7% phthalide, 0.7% phthalic anhydride and 6.7% of the esters described in Example I, and the catalyst used is 0.025% of cobaltous naphthenate. The air is passed through the column at the rate of 18 cu. ft. per hr. The feed mixture is admitted and withdrawn at such a rate that the residence time of the liquid in the column is 40 minutes, and 17% of the oxygen supplied is reacted.

25.4% of the o-xylene present in the feed mixture is reacted, and for each 100 moles of o-xylene consumed there are obtained 2.1 moles of o-toluic acid, 15.3 moles phthalide and 73.5 moles of phthalic anhydride, at a carbon recovery of 90.9%.

Example III

Example II is repeated except that the feed mixture contains 8.8% o-xylene, 54.0% o-toluic acid, 27.5% phthalide, 4.1% phthalic anhydride and 5.6% of the esters, to which is added 0.05% cobaltous naphthenate.

38.0% of the o-xylene in the feed mixture is reacted, and for each 100 moles of o-xylene consumed there are obtained 32.4 moles o-toluic acid, 37.5 moles phthalic anhydride and 12.5 moles of the esters, and no additional phthalide, at a carbon recovery of 95.9%.

Example IV

Example I is repeated except that the feed mixture contains 40% phthalide and 60% meta-xylene, to which is added 0.05% of cobaltous naphthenate, and 38% of the oxygen supplied is reacted.

7.4% of the phthalide present in the feed mixture is reacted, and phthalic anhydride is formed at an efficiency of 92% based on the proportion of phthalide reacted, assuming that none of the meta-xylene is converted to phthalic anhydride.

Example V

A mixture of 48% o-xylene, 26% phthalide and 26% o-toluic acid, to which 0.025% cobaltous naphthenate has been added, is oxidized under the conditions described in Example I. The yield of phthalic anhydride, based on the amount of o-xylene reacted, is 18.7%.

Example VI

A reactor product obtained by oxidation similar to that in Example III is mixed with hot water to produce a mixture containing 6.9% o-xylene, 50.2% o-toluic acid, 27.6% phthalide, 4.8% of the esters, 8.8% phthalic anhydride and 1.7% water. The resulting mixture is maintained at a temperature of 100° C. for 15 minutes, and then passed continuously through a York-Scheibel liquid-liquid extractor, at a temperature of 90° C., counter-current to a stream of distilled water, the latter being supplied to the extractor at a feed rate which is 92% the feed rate of said reactor product. From the bottom of the extractor there is obtained a stream of organic phase containing 7.1% xylene, 46.4% o-toluic acid, 25.0% phthalide, 9.4% ester, 3.2% phthalic anhydride and 8.9% water. This organic phase is dehydrated by azeotropic distillation with o-xylene (containing small amounts of o-toluic acid and phthalide and obtained from the second extractor described below) and is then recycled to the reactor for further oxidation.

From the top of the extractor there is obtained an aqueous phase containing 6% phthalic acid, 3.4% o-toluic acid, 2.2% phthalide and the balance water. This aqueous phase is fed continuously to the top of a second York-Scheibel extractor, operated at a temperature of 90° C., where it is extracted, countercurrent, with an equal weight of o-xylene. From the bottom of this second extractor there is obtained a stream containing 6.4% phthalic acid, only 0.4% o-toluic acid, and the balance water, while from the top of this extractor there is obtained a stream of o-xylene containing the balance of the o-toluic acid as well as the phthalide.

Example VII

A recycle mixture, obtained as described below, and containing o-xylene, o-toluic acid, phthalide, phthalic anhydride and the esters described in Example I, together with cobalt naphthenate as catalyst, is fed continuously to a reactor, maintained at a temperature of 180° C., and a pressure of 200 p.s.i.g. Air is passed through the mixture in the reactor at the rate of 15,200 parts per hour; 25% of the oxygen passed through the reactor is consumed, the balance passing out with the vent gases. The reactor is equipped with a condenser-decanter arrangement, whereby any o-xylene and water in the vent gases condense and separate into two phases, the o-xylene phase being returned to the reactor. From the reactor there is withdrawn a stream of the mixed products of the reaction, at the rate of 20,000 parts per hour. The contents of the reactor are maintained at a constant level and are agitated thoroughly by the air passing therethrough so that the stream of products is a representative sample of the composition of the reactor contents. This product stream, containing 12% o-xylene, 55% o-toluic acid, 20% phthalide, 6% phthalic anhydride and 7% esters, is fed to a hydrolyzer and extraction column, both maintained at a temperature of 100° C., where it is combined with 10,000 parts per hour of hot water. The resulting aqueous extract, containing about 2% phthalide and 3% o-toluic acid, besides the phthalic acid, is fed continuously to the upper portion of a second extraction column into which column a stream of 9700 parts per hour of o-xylene is fed counter-current to the aqueous extract, this extraction column being at a temperature of 100° C. The o-xylene extract from the top of the second column, containing almost all of the o-toluic acid and phthalide fed into said second column, is then combined with the stream of water-immiscible phase (from the bottom of the first extraction column) and the resulting blend is fed to a distillation column where any water contained in said blend is removed overhead as an azeotrope with o-xylene. The substantially anhydrous residue leaves this distillation column at the rate of 18,700 parts per hour and is blended continuously with 1200 parts per hour of o-xylene and 0.025% (on the total weight) of cobalt naphthenate to form the reactor feed mixture described above. This mixture contains about 17% o-xylene, 55% o-toluic acid, 20% phthalide, 1% phthalic anhydride and 7% of the esters.

The aqueous raffinate from the bottom of the second extraction column contains 12% of phthalic acid, and may be fed to any suitable system for the recovery of the phthalic acid as the anhydride.

While water is the preferred solvent for extracting the phthalic acid, as described above, other solvents, such as methanol or ethanol, may be employed for removing this acid from the reaction products, if desired.

It is to be understood that the foregoing detailed description is given merely by way of illustration and that many variations may be made therein without departing from the spirit of our invention.

Having described our invention what we desire to secure by Letters Patent is:

1. Process which comprises passing oxygen through a liquid comprising at least 5% by weight of phthalide in the presence of an oxidation catalyst to produce a liquid phase mixture containing phthalic anhydride and removing phthalic anhydride from said mixture.

2. Process which comprises passing oxygen through a liquid comprising at least 5% by weight of each of phthalide, o-toluic acid and o-xylene in the presence of an oxidation catalyst to produce a liquid phase mixture containing phthalic anhydride and removing phthalic anhydride from said mixture.

3. Process which comprises passing oxygen through a liquid comprising at least 5% by weight of each of phthalide, o-toluic acid and o-xylene in the presence of an oxidation catalyst under superatmospheric pressure and elevated temperature to produce a liquid phase mixture containing phthalic anhydride and removing phthalic anhydride from said mixture.

4. Process which comprises passing oxygen through a liquid comprising at least 5% by weight of each of phthalide, o-toluic acid and o-xylene in the presence of an oxidation catalyst at a pressure between 20 and 1000 p.s.i.g. and a temperature between 100° and 225° C. to produce a liquid phase mixture containing phthalic anhydride and removing phthalic anhydride from said mixture.

5. Process which comprises passing oxygen through a liquid comprising at least 5% by weight of each of phthalide, o-toluic acid and o-xylene at a pressure between 20 and 1000 p.s.i.g. and a temperature between 100° and 225° C. in the presence of an oxidation catalyst comprising a compound of a metal which exists in a plurality of valence states to produce a liquid phase mixture containing phthalic anhydride and removing phthalic anhydride from said mixture.

6. Process as set forth in claim 5 in which said catalyst is a cobalt salt of the group consisting of cobalt acetate and cobalt naphthenate.

7. Process as set forth in claim 2 in which the ratio of o-toluic acid to o-xylene in said liquid is above 3:1.

8. Process as set forth in claim 12 in which the ratio of o-toluic acid to o-xylene in the mixture being oxidized is above 3:1.

9. Process as set forth in claim 12 in which the ratio of o-toluic acid to o-xylene in the mixture being oxidized is about 4 to 6:1.

10. Process as set forth in claim 5, in which the catalyst is a cobalt salt and the water of reaction is removed as it is formed.

11. Process as set forth in claim 10 in which the temperature is 160 to 185° C.

12. Process which comprises oxidizing a liquid phase mixture comprising at least 5% each of o-xylene, o-toluic acid and phthalide in an oxidation zone by passing oxygen therethrough in the presence of an oxidation catalyst to produce a reacted mixture comprising o-xylene, o-toluic acid, phthalide and phthalic anhydride, withdrawing said reacted mixture from said oxidation zone, removing at least a portion of said phthalic anhydride from said withdrawn mixture to produce a remainder containing a larger proportion of o-toluic acid and phthalide than said withdrawn mixture, and recycling said remainder to said oxidation zone together with a further quantity of o-xylene.

13. Process which comprises oxidizing a liquid phase mixture comprising at least 5% each of phthalide and o-xylene in an oxidation zone by passing oxygen therethrough in the presence of an oxidation catalyst to produce an oxidized mixture comprising o-xylene and phthalic anhydride dissolved therein, withdrawing said mixture from said reaction zone, hydrolyzing at least a portion of said phthalic anhydride to form phthalic acid and separating said phthalic acid from said oxidized mixture, and recycling said oxidized mixture, after said separation of phthalic acid, to said oxidation zone together with a further quantity of o-xylene.

14. Process as set forth in claim 13 in which said separation is effected by removal of an aqueous phase containing said phthalic acid and immiscible with the said oxidized mixture.

15. Process as set forth in claim 14 and in which the oxidation is in the presence of a catalyst for said oxidation comprising a compound of a metal which exists in a plurality of valence states and under superatmospheric pressure and at an elevated oxidation temperature.

16. Process as set forth in claim 13 and in which said oxidized mixture contains o-toluic acid and phthalide, in which said separation is by extraction, and in which, after said extraction, substantially all of said o-toluic acid and phthalide are retained in said oxidized mixture.

17. Process which comprises oxidizing a liquid mixture of o-xylene, o-toluic acid, phthalide and esters produced by said oxidation, at a temperature of about 160 to 185° C., and a pressure of 50 to 200 p.s.i.g., by passing air through said mixture in an oxidation zone in the presence of a cobalt catalyst for said oxidation, said mixture containing about 8 to 13 parts o-xylene, 57 to 61 parts o-toluic acid, 21 to 28 parts phthalide and 5 to 7 parts of said esters together with phthalic anhydride produced in said oxidation, continuously withdrawing a portion of said mixture from said oxidation zone, removing at least part of said phthalic anhydride from said withdrawn mixture, blending said mixture, after said removal of phthalic anhydride, with a further quantity of o-xylene and recycling the resulting blend to said oxidation zone.

References Cited in the file of this patent

UNITED STATES PATENTS

| | | |
|---|---|---|
| 2,438,369 | Levine | Mar. 23, 1948 |
| 2,443,832 | Morrell | June 22, 1948 |
| 2,521,466 | Levine | Sept. 5, 1950 |

OTHER REFERENCES

Elderfield: Heterocyclic Compounds, vol. 2, p. 92 (1951).